(12) United States Patent
Watanabe (10) Patent No.: US 12,234,912 B2
(45) Date of Patent: Feb. 25, 2025

(54) BEARING DEVICE FOR VEHICLE WHEEL

(71) Applicant: NTN CORPORATION, Osaka (JP)

(72) Inventor: Tsukasa Watanabe, Shizuoka (JP)

(73) Assignee: NTN CORPORATION, Osaka (JP)

( * ) Notice: Subject to any disclaimer, the term of this patent is extended or adjusted under 35 U.S.C. 154(b) by 84 days.

(21) Appl. No.: 18/020,315

(22) PCT Filed: Sep. 14, 2021

(86) PCT No.: PCT/JP2021/033809
§ 371 (c)(1),
(2) Date: Feb. 8, 2023

(87) PCT Pub. No.: WO2022/059685
PCT Pub. Date: Mar. 24, 2022

(65) Prior Publication Data
US 2023/0286320 A1    Sep. 14, 2023

(30) Foreign Application Priority Data
Sep. 18, 2020   (JP) ................................. 2020-157746

(51) Int. Cl.
*F16C 19/18*   (2006.01)
*B60B 27/00*   (2006.01)
(Continued)

(52) U.S. Cl.
CPC ....... *F16J 15/3256* (2013.01); *B60B 27/0073* (2013.01); *F16C 19/182* (2013.01);
(Continued)

(58) Field of Classification Search
CPC .. B60B 27/0073; F16C 19/182; F16C 19/186; F16C 33/78; F16C 33/7883;
(Continued)

(56) References Cited

U.S. PATENT DOCUMENTS 9,328,771 B2 *   5/2016   Duch ...................... F16C 19/04

FOREIGN PATENT DOCUMENTS

| DE | 102014203210 A1 * | 8/2015 | .......... F16C 33/7886 |
|----|-------------------|--------|------------------------|
| EP | 2 837 507         | 2/2015 |                        |

(Continued)

OTHER PUBLICATIONS

JP2006132684A_DECRIPTION.*

(Continued)

*Primary Examiner* — Phillip A Johnson
(74) *Attorney, Agent, or Firm* — Wenderoth, Lind & Ponack, L.L.P.

(57) ABSTRACT

Provided is a bearing device for a vehicle wheel comprising: an outer-side seal that is resistant to deterioration over time and can prevent foreign matter. This bearing device for a vehicle wheel comprises an outer-side seal member 7 that closes an outer-side opening end of an annular space formed by an outer ring 2 and a hub ring 3. The outer-side seal member 7 including a core metal 8 which is fitted to the outer ring 2, a seal member 10 which is joined to the core metal 8, and a metal ring 9 which is fitted to the hub ring 3 and with which the seal member 10 is in sliding contact. An annular space S is provided between the metal ring 9 and the hub ring 3, and the annular space S being filled with a sealing material 20.

4 Claims, 5 Drawing Sheets

(51) Int. Cl.
- *F16C 33/78* (2006.01)
- *F16J 15/32* (2016.01)
- *F16J 15/3232* (2016.01)
- *F16J 15/3256* (2016.01)
- *F16J 15/3276* (2016.01)
- *F16J 15/40* (2006.01)

(52) U.S. Cl.
CPC ............ *F16C 19/186* (2013.01); *F16C 33/78* (2013.01); *F16C 33/7883* (2013.01); *F16J 15/3232* (2013.01); *F16J 15/3276* (2013.01); *F16J 15/40* (2013.01); *F16C 2326/02* (2013.01)

(58) Field of Classification Search
CPC ................ F16C 2326/02; F16J 15/3232; F16J 15/3276; F16J 15/40
See application file for complete search history.

(56) References Cited

FOREIGN PATENT DOCUMENTS

| | | |
|---|---|---|
| JP | 2006-132684 | 5/2006 |
| JP | 4893648 | 3/2012 |
| JP | 2013-242037 | 12/2013 |
| JP | 2017-160960 | 9/2017 |
| JP | 2018-054095 | 4/2018 |
| KR | 20170065998 A * | 6/2017 |
| WO | 2018/192597 | 10/2018 |

OTHER PUBLICATIONS

JP2013242037A_DESCRIPTION.*
International Search Report issued Nov. 16, 2021, in International (PCT) Application No. PCT/JP2021/033809, with English translation.

* cited by examiner

BEARING DEVICE FOR VEHICLE WHEEL

TECHNICAL FIELD

The present invention relates to a bearing device for a vehicle wheel.

BACKGROUND ART

In a bearing device for a vehicle wheel, a seal member for preventing entry of foreign matter such as muddy water is provided between an outer member and an inner member. An outer-side seal member of the bearing device for a vehicle wheel is fitted to an outer-side end portion of the outer member, and closes an outer-side opening end of an annular space formed by the outer member and the inner member.

There is a bearing device for a vehicle wheel in which a seal structure of a seal member is devised to ensure sealability (See, for example, Patent Literature 1).

In the bearing device for a vehicle wheel disclosed in Patent Literature 1, a gap existing between a curved surface portion of a slinger and a peripheral surface of a rotating-side bearing ring is filled with an adhesive having oil surface adhesiveness over the entire circumference. Thus, sealability of the fitting portion between the slinger and the rotating-side bearing ring is secured.

However, in such a conventional seal structure, in a case where the adhesive cured due to degradation over time or the like is cracked, sealability may be deteriorated. Therefore, there is a demand for a seal member that is resistant to deterioration over time and is capable of preventing entry of foreign matter such as muddy water.

CITATION LIST

Patent Literature

Patent Literature 1: JP-B2 4893648 Gazette

SUMMARY OF INVENTION

Technical Problems

The present invention has been made in view of the above circumstances, and an object of the present invention is to provide a bearing device for a vehicle wheel including an outer-side seal that is resistant to deterioration over time and can prevent foreign matter such as muddy water from penetrating into the interior of a bearing.

Solutions to Problems

A first invention includes: an outer member which has a plurality of rows of outer raceway surfaces provided on an inner periphery; an inner member which includes a hub ring and at least one inner ring, the hub ring having a small-diameter step portion that is provided on an outer periphery and axially extends and a vehicle wheel mounting flange that is disposed on an outer side with respect to the small-diameter step portion, the at least one inner ring being press-fitted to the small-diameter step portion of the hub ring, the inner member having a plurality of rows of inner raceway surfaces that are provided on an outer periphery and face the plurality of rows of outer raceway surfaces; a plurality of rows of rolling elements that are rollably accommodated between the plurality of rows of inner raceway surfaces of the inner member and the plurality of rows of outer raceway surfaces of the outer member; and an outer-side seal member that closes an outer-side opening end of an annular space formed by the outer member and the inner member, the outer-side seal member including a core metal which is fitted to the outer member, a seal member which is joined to the core metal, and a metal ring which is fitted to the hub ring of the inner member and with which the seal member is in sliding contact, and an annular space being provided between the metal ring and the hub ring, and the annular space being filled with a filler.

Advantageous Effects of Invention

According to the present invention, the bearing device for a vehicle wheel including the outer-side seal member can be provided in which by filling the annular space between the metal ring and the hub ring with the filler, it is possible to prevent foreign matter such as muddy water from penetrating into the interior of a bearing through the annular space and muddy water resistance is improved.

DESCRIPTION OF EMBODIMENTS

Hereinafter, a bearing device for a vehicle wheel 1 as a first embodiment of a bearing device for a vehicle wheel will be described with reference to FIGS. 1 and 2. Note that in the following description, an inner side represents the vehicle body side of the bearing device for a vehicle wheel 1 when attached to the vehicle body, and an outer side represents the vehicle wheel side of the bearing device for a vehicle wheel 1 when attached to the vehicle body.

Figure 1:
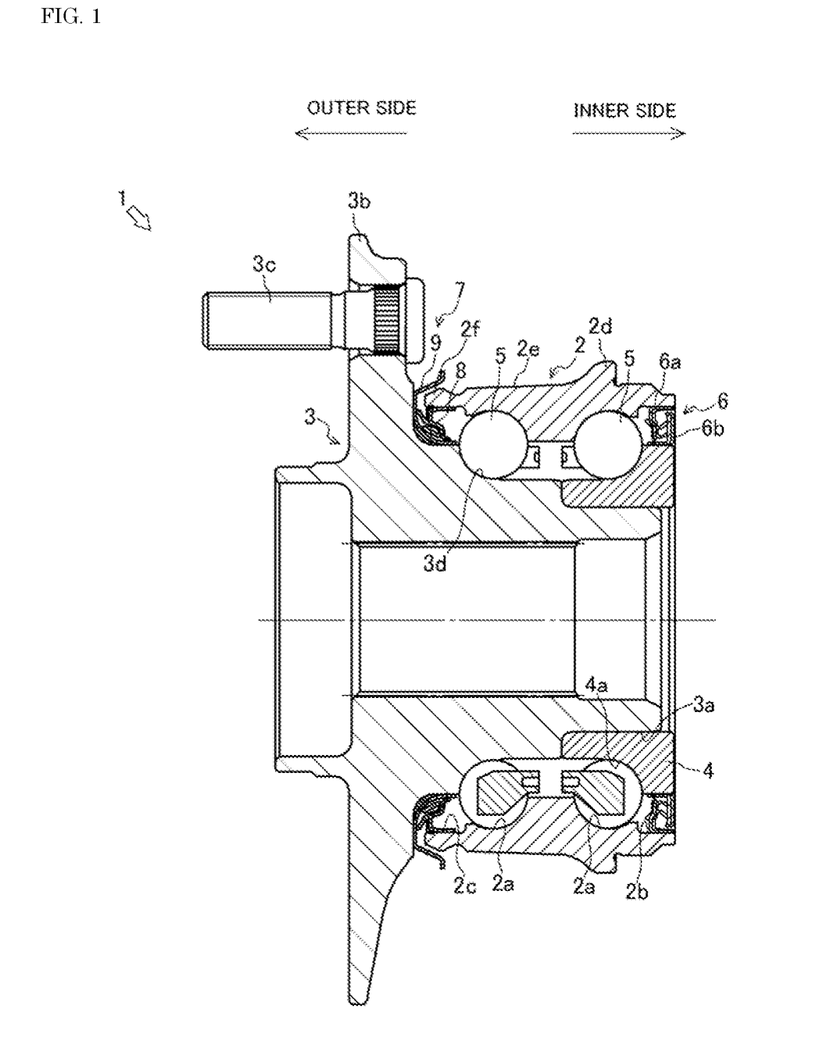
FIG. 1 is a cross-sectional view illustrating an overall configuration of a bearing device for a vehicle wheel according to a first embodiment.

As illustrated in FIG. 1, the bearing device for a vehicle wheel 1 rotatably supports a vehicle wheel in a suspension device of a vehicle such as an automobile. The bearing device for a vehicle wheel 1 includes an outer ring 2, a hub ring 3, an inner ring 4, rolling elements 5, an inner-side seal member 6, and an outer-side seal member 7.

As illustrated in FIG. 1, the outer ring 2, which is an outer member, supports the hub ring 3 and the inner ring 4. An inner-side opening 2b into which the inner-side seal member 6 can be fitted is formed in an inner-side end portion of the outer ring 2. An outer-side opening 2c into which the outer-side seal member 7 can be fitted is formed in an outer-side end portion 2f of the outer ring 2. A vehicle body mounting flange 2d for being mounted to a knuckle of the suspension device, not illustrated, is integrally provided on an outer peripheral surface 2e of the outer ring 2. On the inner side and the outer side of the inner peripheral surface of the outer ring 2, a plurality of rows of inner raceway surfaces 2a, 2a are provided in the circumferential direction.

The inner member includes the hub ring 3 and the inner ring 4. The hub ring 3 rotatably supports the vehicle wheel of the vehicle, not illustrated. A small-diameter step portion 3a whose diameter is reduced is provided on the outer peripheral surface of an inner-side end portion of the hub ring 3. A vehicle wheel mounting flange 3b for mounting the vehicle wheel is integrally provided at an outer-side end portion of the hub ring 3. A hub bolt 3c for fastening the hub ring 3 and a vehicle wheel or a brake device is press-fitted into the vehicle wheel mounting flange 3b. An inner raceway surface 3d is provided on the outer side on the outer peripheral surface of the hub ring 3. A shoulder portion 3e, a curved surface portion 3f, and a flat surface portion 3g, which are portions where the outer-side seal member 7 is disposed, are continuously provided on the outer side with respect to the inner raceway surface 3d on the outer peripheral surface (see FIG. 2 and the like). The flat surface portion 3g is located at the base end portion of the vehicle wheel mounting flange 3b.

The inner ring 4 is press-fitted to the small-diameter step portion 3a of the hub ring 3. An inner raceway surface 4a is provided on the outer peripheral surface of the inner ring 4. That is, the inner ring 4 forms the inner raceway surface 4a on the inner side of the hub ring 3.

The rolling elements 5 include a plurality of balls and cages that hold the balls, respectively.

The inner-side seal member 6 includes a substantially cylindrical seal plate 6a and a substantially cylindrical slinger 6b. The seal plate 6a is fitted to the inner-side opening 2b of the outer ring 2, and the slinger 6b is fitted to the inner ring 4.

Figure 2:
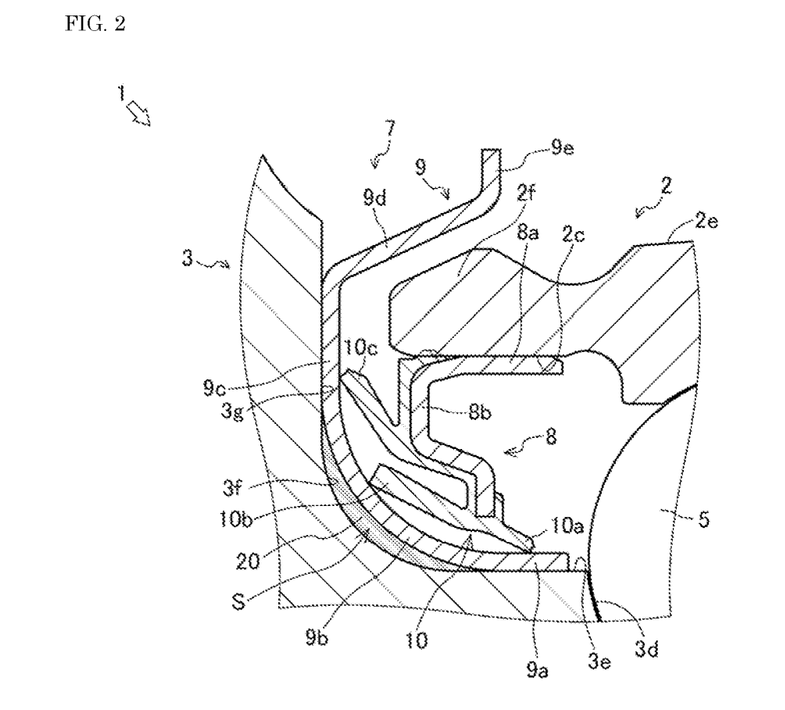
FIG. 2 is an enlarged cross-sectional view illustrating an outer-side seal member of the bearing device for a vehicle wheel according to the first embodiment.

As illustrated in FIGS. 1 and 2, the outer-side seal member 7 closes the outer-side opening end of the annular space formed by the outer ring 2 and the hub ring 3. The outer-side seal member 7 includes a core metal 8, a metal ring 9, a seal member 10, and a sealing material 20.

The core metal 8 is formed by, for example, pressing a steel plate. As illustrated in FIG. 2, the core metal 8 includes a cylindrical portion 8a and a bent portion 8b.

The cylindrical portion 8a is fitted into the outer-side opening 2c of the outer ring 2 (the inner peripheral surface of the outer-side end portion 2f of the outer ring 2). The bent portion 8b is bent from the outer-side end portion of the cylindrical portion 8a and extends radially inward.

The seal member 10 made of, for example, synthetic rubber is joined (here, vulcanized-bonded) to the core metal 8. A radial lip 10a, an inner axial lip 10b, and an outer axial lip 10c of the seal member 10 are joined to the bent portion 8b. The radial lip 10a is provided on the radially innermost side of the bent portion 8b. The radial lip 10a prevents grease inside the bearing device for a vehicle wheel 1 from leaking to the outside. The inner axial lip 10b is provided radially outside the radial lip 10a. The outer axial lip 10c is provided radially outside the inner axial lip 10b.

The metal ring 9 is formed by, for example, pressing a steel plate. The metal ring 9 includes a cylindrical portion 9a, a curved portion 9b, a disk portion 9c, a tapered portion 9d, and a flange portion 9e.

The cylindrical portion 9a is fitted to the shoulder portion 3e (portion adjacent to the inner peripheral raceway surface 3d on the outer side) of the hub ring 3. The radial lip 10a is in sliding contact with the cylindrical portion 9a via a grease oil film. The curved portion 9b has a substantially arc shape in a cross-sectional view, and increases in diameter radially outward from the outer-side end portion of the cylindrical portion 9a toward the outer side. The inner axial lip 10b is in sliding contact with the curved portion 9b via the grease oil film. The disk portion 9c extends radially outward from a front end portion of the curved portion 9b. The outer axial lip 10c is in sliding contact with the disk portion 9c via the grease oil film. The disk portion 9c faces the flat surface portion 3g of the hub ring 3. Note that the curved portion 9b is a portion between a portion of the metal ring 9 fitted to the hub ring 3 and a portion of the metal ring 9 facing the vehicle wheel mounting flange 3b.

The curved portion 9b of the metal ring 9 is provided to improve rigidity of the metal ring 9. By providing the curved portion 9b, rigidity of the metal ring 9 can be improved, and movement of the metal ring 9 when a turning load of the vehicle is applied can be suppressed.

The tapered portion 9d increases in diameter from the outer peripheral edge of the disk portion 9c toward the inner side. The flange portion 9e extends radially outward from the front end portion of the tapered portion 9d.

The hub ring 3 has the curved surface portion 3f which faces the curved portion 9b of the metal ring 9 and is an outer peripheral surface having a substantially arc shape in a cross-sectional view. The curved surface portion 3f is formed over the entire circumference of the hub ring 3. The curved surface portion 3f increases in diameter radially outward from the outer-side end of the shoulder portion 3e of the hub ring 3 toward the outer side. An annular space S having a substantially crescent shape in a cross-sectional view is provided between the curved portion 9b and the curved surface portion 3f. The annular space S is filled with the sealing material 20, which is an example of a filler. The sealing material 20 is a material that is applied to a space (gap) portion of a structure to exhibit functions such as waterproofness and airtightness. The sealing material 20 of the present embodiment is held in a gel state (paste state). That is, the sealing material 20 of the present embodiment is not cured. The sealing material 20 has predetermined viscosity. As the sealing material 20, there are various choices from an acrylic-based sealing material, a urethane-based sealing material, a polyurethane-based sealing material, a silicon-based sealing material, a modified silicon sealing material, an oily coking-based sealing material, a polysulfide-based sealing material, a butyl rubber-based sealing material, and the like.

As a method of filling the annular space S with the sealing material 20, for example, before the outer-side seal member 7 is assembled to the hub ring 3, the sealing material 20 is applied annularly along the circumferential direction of the annular curved surface portion 3f of the hub ring 3 by using a coating device, and the outer-side seal member 7 is assembled to the hub ring 3 to which the sealing material 20 is applied, and therefore the applied sealing material 20 spreads and is filled in the annular space S. Thus, the annular space S is sealed by the sealing material 20.

In addition, with respect to the filling amount of the sealing material 20 into the annular space S, the upper limit value is an amount of filling 100% of the volume of the annular space S, that is, the space volume between the hub ring 3 (curved surface portion 3f) and the metal ring 9 (curved portion 9b) with the sealing material 20 (amount that does not protrude to the outside of the annular space S), and the lower limit value is an amount by which the sealing material 20 is uniformly applied at least to the fitting portion between the hub ring 3 and the metal ring 9 without any gap. Within such a filling amount range, the sealing material 20 can exhibit functions such as waterproofness and airtightness.

Figure 5:
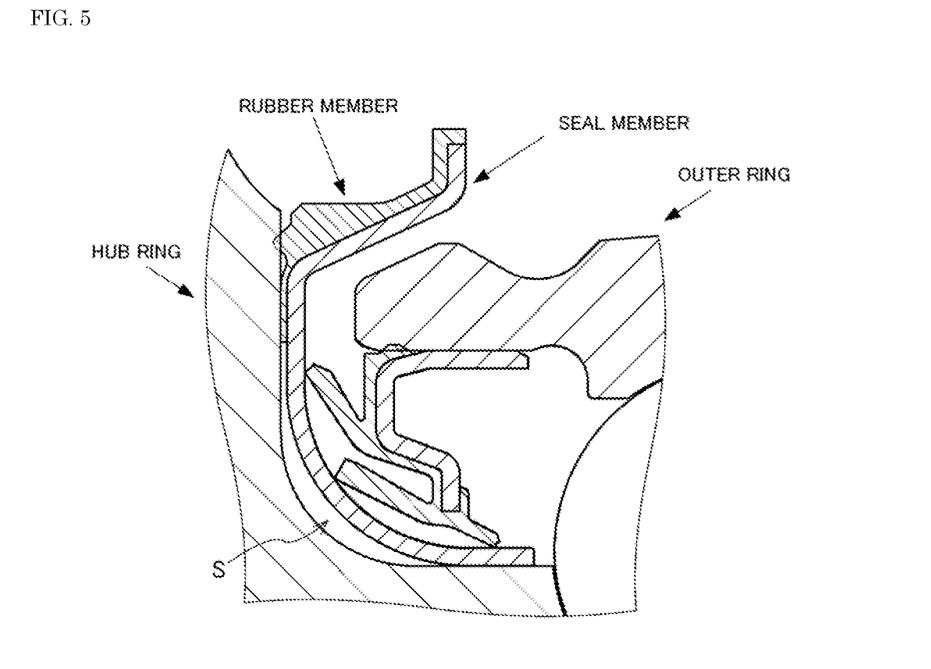
FIG. 5 is an enlarged cross-sectional view illustrating an outer-side seal member of a conventional bearing device for a vehicle wheel.

According to the configuration described above, the annular space S is provided between the curved portion 9b of the metal ring 9 and the curved surface portion 3f of the hub ring 3, and the sealing material 20 is filled in the annular space S. As a result, it is possible to prevent foreign matter such as muddy water from penetrating into the interior of the bearing through the annular space S and to improve muddy water resistance. That is, since a conventional bearing device for a vehicle wheel has an annular space S as illustrated in FIG. 5, there is a possibility that foreign matter such as muddy water accumulates in the annular space S and the foreign matter such as muddy water intrudes into the interior of a bearing. In contrast, in the bearing device for a vehicle wheel 1 of the present embodiment, since the annular space S is sealed by the sealing material 20, it is possible to suppress accumulation of foreign matter such as muddy water in the annular space S and to prevent the foreign matter such as muddy water from penetrating into the interior of the bearing. That is, the sealing material 20 functions to close the annular space S, which is one of the paths through which foreign matter such as muddy water enters. In addition, since the sealing material 20 of the present embodiment is held in a gel state (paste state) without being cured, degradation over time such as cracking due to curing is suppressed.

The outer-side seal member 7 of the bearing device for a vehicle wheel 1 is not provided with a rubber member unlike the conventional bearing device for a vehicle wheel illustrated in FIG. 5. Therefore, in the bearing device for a vehicle wheel 1, it is not necessary to provide a region for arranging a rubber member in the flat surface portion 3g that is the surface in contact with the metal ring 9 (disk portion 9c) in the hub ring 3, and the outer-side seal member can be downsized.

In addition, since the outer-side seal member 7 of the bearing device for a vehicle wheel 1 is not provided with a rubber member, there is an advantage that no design restriction is imposed even in a case where the outer-side seal member and a peripheral component such as a head portion of a hub bolt are close to each other. Furthermore, since the outer-side seal member 7 of the bearing device for a vehicle wheel 1 is not provided with a rubber member, the cost can be reduced.

Next, a second embodiment and a third embodiment will be described as modifications of the bearing device for a vehicle wheel according to the present invention with reference to the drawings. In the following description of each embodiment, portions added or changed in each embodiment will be mainly described, and the same components and the same portions or components and portions having similar functions will be denoted by the same reference numerals, and description thereof will be omitted.

Second Embodiment

Figure 3:
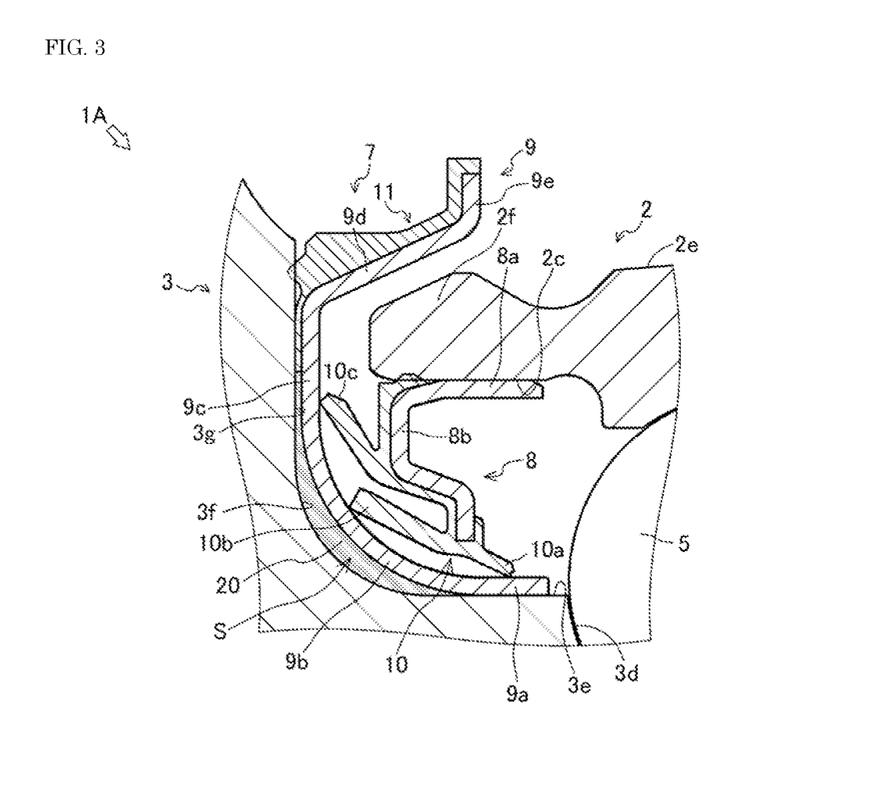
FIG. 3 is an enlarged cross-sectional view illustrating an outer-side seal member of a bearing device for a vehicle wheel according to a second embodiment.

Next, a bearing device for a vehicle wheel 1A as the second embodiment of the bearing device for a vehicle wheel according to the present invention will be described with reference to FIG. 3. The bearing device for a vehicle wheel 1A according to the present embodiment is a modification of the first embodiment, and a rubber member 11 is added to the outer-side seal member 7 of the bearing device for a vehicle wheel 1 according to the first embodiment.

The rubber member 11 is joined (here, vulcanized-bonded) to surfaces of a disk portion 9c, a tapered portion 9d, and a flange portion 9e which face a flat surface portion 3g of a hub ring 3 in the axial direction. The rubber member 11 is, for example, synthetic rubber. The rubber member 11 is provided radially outside a metal ring 9 and is in contact with the flat surface portion 3g of the hub ring 3.

As a result, the bearing device for a vehicle wheel 1A has the effect similar to that of the bearing device for a vehicle wheel 1 of the first embodiment, and since the rubber member 11 is provided, it is possible to further suppress foreign matter such as muddy water from penetrating into the interior of a bearing.

Third Embodiment

Figure 4:
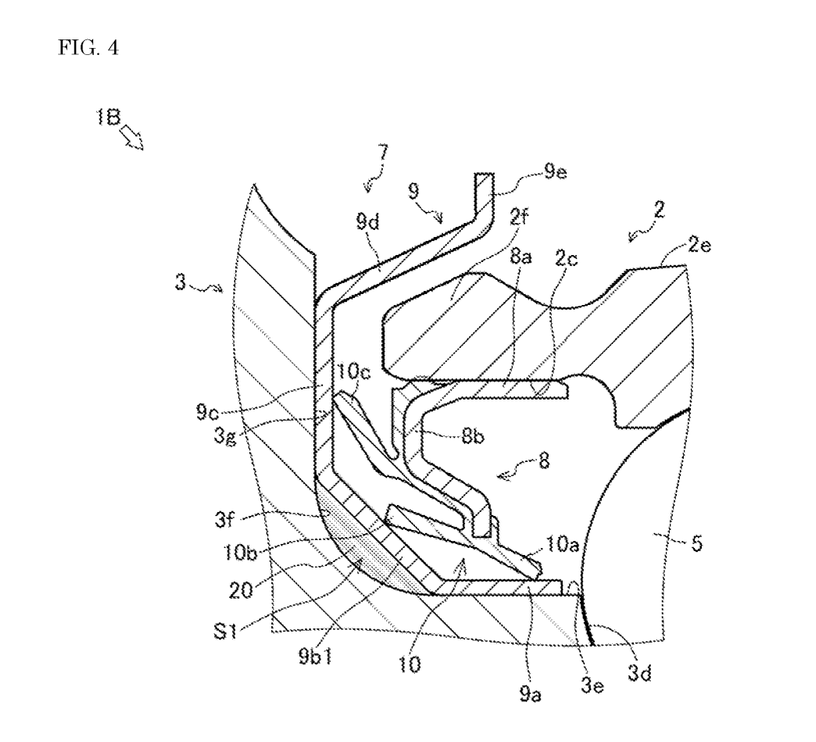
FIG. 4 is an enlarged cross-sectional view illustrating an outer-side seal member of a bearing device for a vehicle wheel according to a third embodiment.

Next, a bearing device for a vehicle wheel 1B as the third embodiment of the bearing device for a vehicle wheel according to the present invention will be described with reference to FIG. 4. The bearing device for a vehicle wheel 1B according to the present embodiment is a modification of the first embodiment, and includes a folded portion 9b1 in lieu of the curved portion 9b in the bearing device for a vehicle wheel 1 according to the first embodiment. The folded portion 9b1 has a linear shape in a cross-sectional view, and increases in diameter radially outward from the outer-side end portion of a cylindrical portion 9a toward the outer side. The folded portion 9b1 is a portion between a portion of a metal ring 9 fitted to a hub ring 3 and a portion of the metal ring 9 facing a vehicle wheel mounting flange 3b. An annular space S1 having a substantially semi-elliptical shape in a cross-sectional view is provided between the folded portion 9b1 and a curved surface portion 3f. The annular space S1 is filled with a sealing material 20.

Thus, the bearing device for a vehicle wheel 1B has the effect similar to that of the bearing device for a vehicle wheel 1 of the first embodiment. In addition, in a case where the folded portion 9b1 is formed linearly, the annular space S1 becomes larger; however, the annular space S1 can be easily sealed by filling the annular space S1 with the sealing material 20, which is a filler. As a result, muddy water resistance is further improved.

Note that a rubber member 11 may be added to the bearing device for a vehicle wheel 1B as in the bearing device for a vehicle wheel 1A of the second embodiment.

As described above, each of the bearing devices for a vehicle wheel 1, 1A, and 1B according to the present embodiments has been described as a bearing device for a vehicle wheel having a third-generation structure in which the inner raceway surface 3d of the rolling elements 5 is directly formed on the outer periphery of the hub ring 3. However, each of the bearing devices for a vehicle wheel 1, 1A, and 1B is not limited to this, and for example, may have a second-generation structure of inner ring rotation in which a pair of inner rings 4 is press-fitted and fixed to the hub ring 3. In addition, the above-described embodiments are merely representative forms of the present invention, and various modifications can be made without departing from the gist of the present invention.

INDUSTRIAL APPLICABILITY

The present invention is applicable to a bearing device for a vehicle wheel.

REFERENCE SIGNS LIST 1 bearing device for a vehicle wheel
2 outer ring
2a outer raceway surface
2e outer peripheral surface 2f outer-side end portion
3 hub ring
3a small-diameter step portion
3b vehicle wheel mounting flange
4 inner ring
4a inner raceway surface
5 rolling element
7 outer-side seal member
8 core metal
9 metal ring
10 seal member
20 sealing material
S annular space

The invention claimed is:

1. A bearing device for a vehicle wheel, the bearing device comprising:
   an outer member which has a plurality of rows of outer raceway surfaces provided on an inner periphery;
   an inner member which includes a hub ring and at least one inner ring, the hub ring having a small-diameter step portion that is provided on an outer periphery and extends axially and a vehicle wheel mounting flange that is disposed on an outer side with respect to the small-diameter step portion, the at least one inner ring being press-fitted to the small-diameter step portion of the hub ring, and the inner member having a plurality of rows of inner raceway surfaces that are provided on an outer periphery and face the plurality of rows of outer raceway surfaces;
   a plurality of rows of rolling elements that are rollably accommodated between the inner raceway surfaces of the inner member and the outer raceway surfaces of the outer member;
   an outer-side seal member that closes an outer-side opening end of an annular space formed by the outer member and the inner member, the outer-side seal member including a core metal which is fitted to the outer member, a seal member which is joined to the core metal, and a metal ring which is fitted to the hub ring of the inner member and with which the seal member is in sliding contact; and
   a rubber member that is provided radially outside the metal ring and is in contact with the vehicle wheel mounting flange of the hub ring,
   wherein an annular space is provided between a radially inside end portion of the rubber member, the metal ring and the hub ring, and the annular space is filled with a filler.

2. The bearing device for a vehicle wheel according to claim 1, wherein the filler is a sealing material.

3. The bearing device for a vehicle wheel according to claim 1, wherein a portion of the metal ring between a portion of the metal ring fitted to the hub ring and a portion of the metal ring facing the vehicle wheel mounting flange is formed linearly in a cross-sectional view.

4. The bearing device for a vehicle wheel according to claim 2, wherein a portion of the metal ring between a portion of the metal ring fitted to the hub ring and a portion of the metal ring facing the vehicle wheel mounting flange is formed linearly in a cross-sectional view.

* * * * *